(No Model.)

J. KREISCHER.
MACHINE FOR CUTTING CANDIES.

No. 300,873. Patented June 24, 1884.

Witnesses:
S. B. Brewer,
H. V. Scattergood.

Inventor:
JACOB KREISCHER,
by
William H. Low,
Attorney.

UNITED STATES PATENT OFFICE.

JACOB KREISCHER, OF ALBANY, NEW YORK.

MACHINE FOR CUTTING CANDIES.

SPECIFICATION forming part of Letters Patent No. 300,873, dated June 24, 1884.

Application filed April 17, 1884. (No model.)

*To all whom it may concern:*

Be it known that I, JACOB KREISCHER, of the city and county of Albany, in the State of New York, have invented certain new and useful Improvements in Machines for Cutting Candies, of which the following is a specification.

My invention relates to a machine for cutting candies from a sheet or mass while in a plastic condition; and it consists of a machine having a reciprocating cutting-head provided with cutters composed of fine wires, which are held in a tense condition, the said cutters being adapted to pass into corresponding grooves formed in a cutting-block or bed-piece, on which the candy is held in such manner that the separations will be effected by clean cuts through the candy.

Figure 1:
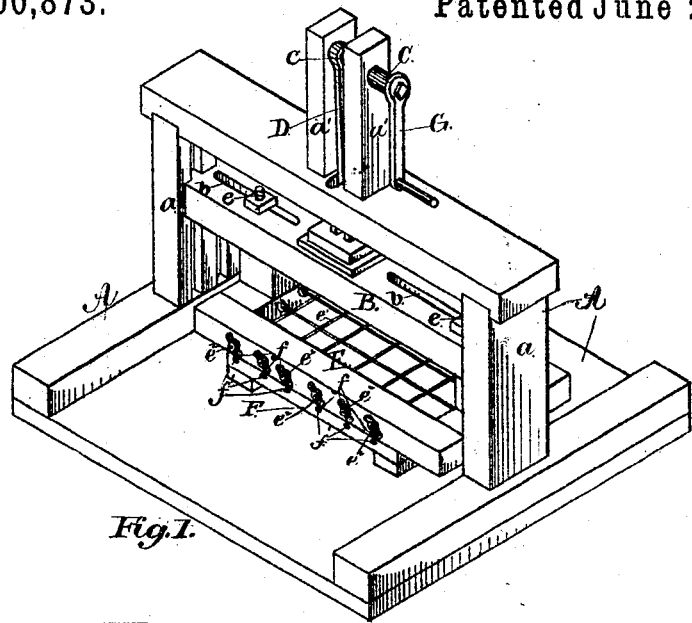
Figure 2:
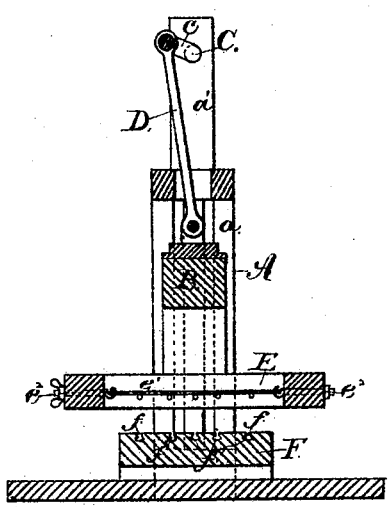
Figure 3:
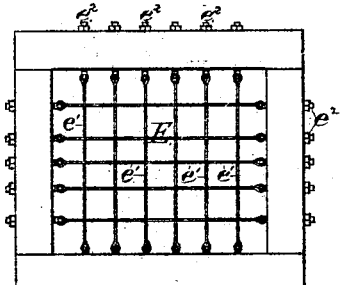
Figure 4:
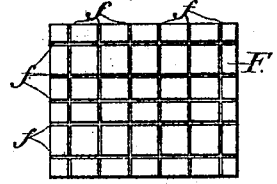
Figure 5:
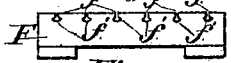

In the accompanying drawings, which form part of this specification, and to which reference is made herein, Figure 1 is a perspective view of my candy-cutting machine; Fig. 2, a vertical section of same; Fig. 3, a plan view of the cutter-frame. Figs. 4 and 5 are respectively a plan view and side elevation of a cutting-block; and Fig. 6, an inverted plan view of a cutter-frame containing cutting-wires arranged in different forms.

Figure 6:
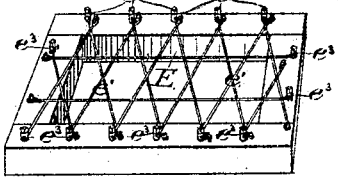

As represented in the drawings, A is the frame-work of the machine, the side pieces, $a$, of which are provided with guides for giving direction to the reciprocating movements of the cross-head B. A crank-shaft, C, is journaled in the standards $a'$ of said frame-work, and is connected, by means of the pitman D, to the cross-head B in such manner that its crank $c$ will impart a reciprocating motion to said cross-head. The cutter-frame E is attached to the under side of the cross-head B by means of bolts $e$, which pass through slots $b$ in said cross-head, so as to allow the cutter-frame to be adjusted in place. The said cutter-frame is provided with a series of cutters, $e'$, which are made of fine wire, and are held in a tense condition by means of straining-bolts $e^2$, as shown in Fig. 3, or by straining-studs $e^3$, (like those used in piano-fortes,) as shown in Fig. 6. The cutting-wires $e'$ may be arranged in rectangular lines, as shown in Fig. 3, in oblique lines, as shown in Fig. 6, or in any other manner to suit the taste or fancy.

The bed-piece F is provided with grooves $f$, which correspond to the arrangement of the cutting-wires $e'$ of the cutter-frame. Said grooves terminate at their bottoms in enlargements $f'$, which are preferably made in cylindrical form, and into which any dust or minute particles from the candy which may be pushed into the grooves $f$ by the cutting-wires $e'$ will be collected. Any deposition of such dust or particles in the enlargements $f'$ may be removed therefrom by simply pushing a suitable rod endwise through said enlargements. The bed-piece F is secured to the bottom plate of the frame-work A in such position that its grooves $f$ will coincide with the cutters $e'$, and at such height that the cutters $e'$ will, at the lowest point of the stroke of the cross-head B, pass into the grooves $f$, so as to lie below the plane of the upper face of the bed-piece. A hand-crank, G, is secured to the shaft C for the purpose of imparting a rotatory motion to said shaft while operating the machine by hand; but, when preferred, pulleys or gear-wheels may be substituted for said hand-crank when the machine is driven by motive power. While the cross-head B is at or near the highest point of its upward stroke, a sheet of candy of the proper consistency is slipped in on top of the bed-piece F. Then as the cross-head B, and its attached cutter-frame E descends, the cutters $e'$ cut and separate the sheet of candy into pieces that conform in shape and size to the openings between the wires that form said cutters. The candy-dust or fine particles, that are carried, by the action of the cutters $e'$, into the grooves $f$, will fall into the enlargements $f'$, from whence they can be removed in the manner hereinbefore described.

I claim as my invention—

1. In a candy-cutting machine, the combination, with a reciprocating head, B, having a cutter-frame, E, attached thereto, the latter being provided with cutters $e'$, made of fine wires held in a tense condition, as herein described, of a bed-piece, F, provided with grooves $f$, which coincide with the cutters $e'$, as herein set forth, all being constructed and arranged to operate substantially as and for the purpose herein specified.

2. The bed-piece F for a candy-cutting machine, provided with grooves $f$, having in their lower parts the enlargements $f'$, as and for the purpose herein specified.

JACOB KREISCHER.

Witnesses:
WM. H. LOW,
MAX WOLFF.